(12) United States Patent
Cash

(10) Patent No.: US 6,576,198 B2
(45) Date of Patent: Jun. 10, 2003

(54) MODULAR VOC ENTRAPMENT CHAMBER FOR A TWO-CHAMBER REGENERATIVE OXIDIZER

(75) Inventor: James T. Cash, Hackettstown, NJ (US)

(73) Assignee: Megtec Systems, Inc., DePere, WI (US)

( * ) Notice: Subject to any disclaimer, the term of this patent is extended or adjusted under 35 U.S.C. 154(b) by 38 days.

(21) Appl. No.: 09/929,588

(22) Filed: Aug. 14, 2001

(65) Prior Publication Data

US 2003/0035762 A1 Feb. 20, 2003

(51) Int. Cl.⁷ .................. B01D 53/34; B01D 50/00; F01N 3/10
(52) U.S. Cl. .................. 422/173; 422/175; 422/168; 422/169
(58) Field of Search .................. 422/173, 168, 422/175, 169

(56) References Cited

U.S. PATENT DOCUMENTS

| | | | |
|---|---|---|---|
| 3,870,474 A | 3/1975 | Houston | 23/277 |
| 4,079,808 A | * 3/1978 | Mizuno et al. | 181/237 |
| 5,145,648 A | * 9/1992 | Miyahara et al. | 422/124 |
| 5,161,968 A | 11/1992 | Nutcher et al. | 432/179 |
| 5,297,954 A | 3/1994 | Colagiovanni | 431/5 |
| 5,376,340 A | 12/1994 | Bayer et al. | 422/175 |
| 5,453,259 A | 9/1995 | D'Souza | 423/245.1 |
| 5,567,390 A | * 10/1996 | Cleary | 422/111 |
| 5,578,276 A | 11/1996 | Klobucar | 422/173 |
| 5,620,668 A | * 4/1997 | Driscoll et al. | 422/175 |
| 5,833,938 A | 11/1998 | Blazejewski | 422/175 |
| 5,931,663 A | 8/1999 | Lewandowski et al. | 432/181 |
| 6,042,791 A | * 3/2000 | Johnson et al. | 422/173 |

FOREIGN PATENT DOCUMENTS

WO 97/44119 11/1997

\* cited by examiner

Primary Examiner—Glenn Caldarola
Assistant Examiner—Douglas W Rudnick
(74) Attorney, Agent, or Firm—Mitchell D. Bittman; Kevin S. Lemack

(57) ABSTRACT

Regenerative oxidizer including an entrapment chamber and damper assembly, as well as a method of oxidizing volatile organic compounds in a gas using such apparatus. To improve the VOC destruction efficiency and eliminate opacity issues resulting from heat exchange matrix regeneration, untreated fluid can be diverted away from the oxidizer exhaust stack and directed into a "holding vessel" or VOC entrapment chamber. The assembly utilizes a single damper in order to divert the exhaust flow from the oxidizer either to exhaust or to the entrapment chamber. The entrapment chamber preferably has a modular construction, which facilitates expanding or decreasing the volume of the chamber. The design facilitates installation and can be retrofitted on existing equipment. The damper diverts the flow of gas with minimal or no negative impact on the process flow.

7 Claims, 7 Drawing Sheets

MODULAR VOC ENTRAPMENT CHAMBER FOR A TWO-CHAMBER REGENERATIVE OXIDIZER

BACKGROUND OF THE INVENTION

The control and/or elimination of undesirable impurities and by-products from various manufacturing operations has gained considerable importance in view of the potential pollution such impurities and by-products may generate. One conventional approach for eliminating or at least reducing these pollutants is by thermal oxidation. Thermal oxidation occurs when contaminated air containing sufficient oxygen is heated to a temperature high enough and for a sufficient length of time to convert the undesired compounds into harmless gases such as carbon dioxide and water vapor. Catalysts can be used to enhance the process.

One application of such oxidizers is in conjunction with web drying apparatus, including flotation dryers. Such dryers are capable of contactless supporting and drying a moving web of material, such as paper, film or other sheet material, via heated air issuing from a series of typically opposing air nozzles, requires a heat source for the heated air. As a result of the drying process, undesirable volatile organic compounds (VOCs) may evolve from the moving web of material, especially where the drying is of a coating of ink or the like on the web. Such VOCs are mandated by law to be converted to harmless gases prior to release to the environment.

In view of the high cost of the fuel necessary to generate the required heat for oxidation, it is advantageous to recover as much of the heat as possible. To that end, U.S. Pat. No. 3,870,474 discloses a thermal regenerative oxidizer comprising three regenerators, two of which are in operation at any given time while the third receives a small purge of purified air to force out any untreated or contaminated air therefrom and discharges it into a combustion chamber where the contaminants are oxidized. Upon completion of a first cycle, the flow of contaminated air is reversed through the regenerator from which the purified air was previously discharged, in order to preheat the contaminated air during passage through the regenerator prior to its introduction into the combustion chamber. In this way, heat recovery is achieved.

U.S. Pat. No. 3,895,918 discloses a thermal rotary regeneration system in which a plurality of spaced, non-parallel heat-exchange beds are disposed toward the periphery of a central, high-temperature combustion chamber. Each heat-exchange bed is filled with heat-exchanging ceramic elements. Exhaust gases from industrial processes are supplied to an inlet duct, which distributes the gases to selected heat-exchange sections depending upon whether an inlet valve to a given section is open or closed.

Current state-of-the-art regenerative thermal or catalytic oxidizers that utilize two heat exchange beds generally include the addition of some means of capturing the untreated gases which bypass the oxidizer during valve switches or cycle changes. These systems are referred to as entrapment chambers or puff chambers, an example of which is shown in U.S. Pat. No. 5,833,938, the disclosure of which is hereby incorporated by reference. Use of such chambers increases the VOC destruction efficiency of the apparatus, since untreated gases that otherwise would escape are captured and recycled for treatment. Such chambers typically employ one or more valves, such as poppet valves or butterfly valves, to divert the untreated gases into a holding plenum during the cycle change, and then bleed or purge the chamber clean between cycle changes. The plenum exhaust may be directed back to the system inlet or directly to the burner chamber to be treated.

Problems with current systems include the cost of the damper system needed to operate the chamber, the modifications necessary to the regenerative oxidizer to accommodate the chamber, the high pressure drop that occurs across the chamber which requires upsizing the main draft fan, and the process flow disturbances that occur as a result of the switching of the diverting dampers and back pressure of the chamber.

It would be desirable to design an entrapment chamber that reduces or eliminates the aforementioned drawbacks of conventional systems.

SUMMARY OF THE INVENTION

The problems of the prior art have been overcome by the present invention, which provides a regenerative oxidizer including an entrapment chamber and damper assembly, as well as a method of oxidizing volatile organic compounds in a gas using such apparatus. To improve the VOC destruction efficiency and eliminate opacity issues resulting from heat exchange matrix regeneration, untreated fluid can be diverted away from the oxidizer exhaust stack and directed into a "holding vessel" or VOC entrapment chamber. The function of the entrapment chamber is to contain the slug of untreated fluid which occurs during the matrix regeneration process long enough so that the majority of it can be slowly recycled (i.e., at a very low flow rate) back to the inlet of the oxidizer for treatment, or can be supplied to the combustion blower as combustion air, or slowly bled to atmosphere through the exhaust stack. The untreated fluid in the entrapment chamber must be entirely evacuated within the time frame allotted between matrix regeneration cycles since the process must repeat itself for all subsequent matrix regenerations.

The assembly utilizes a single swing damper in order to divert the exhaust flow from the oxidizer either to exhaust or to the entrapment chamber. The entrapment chamber preferably has a modular construction, which facilitates expanding or decreasing the volume of the chamber. The design facilitates installation and can be retrofitted on existing equipment. The damper diverts the flow of gas with minimal or no negative impact on the process flow.

DETAILED DESCRIPTION OF THE INVENTION

Figure 1:
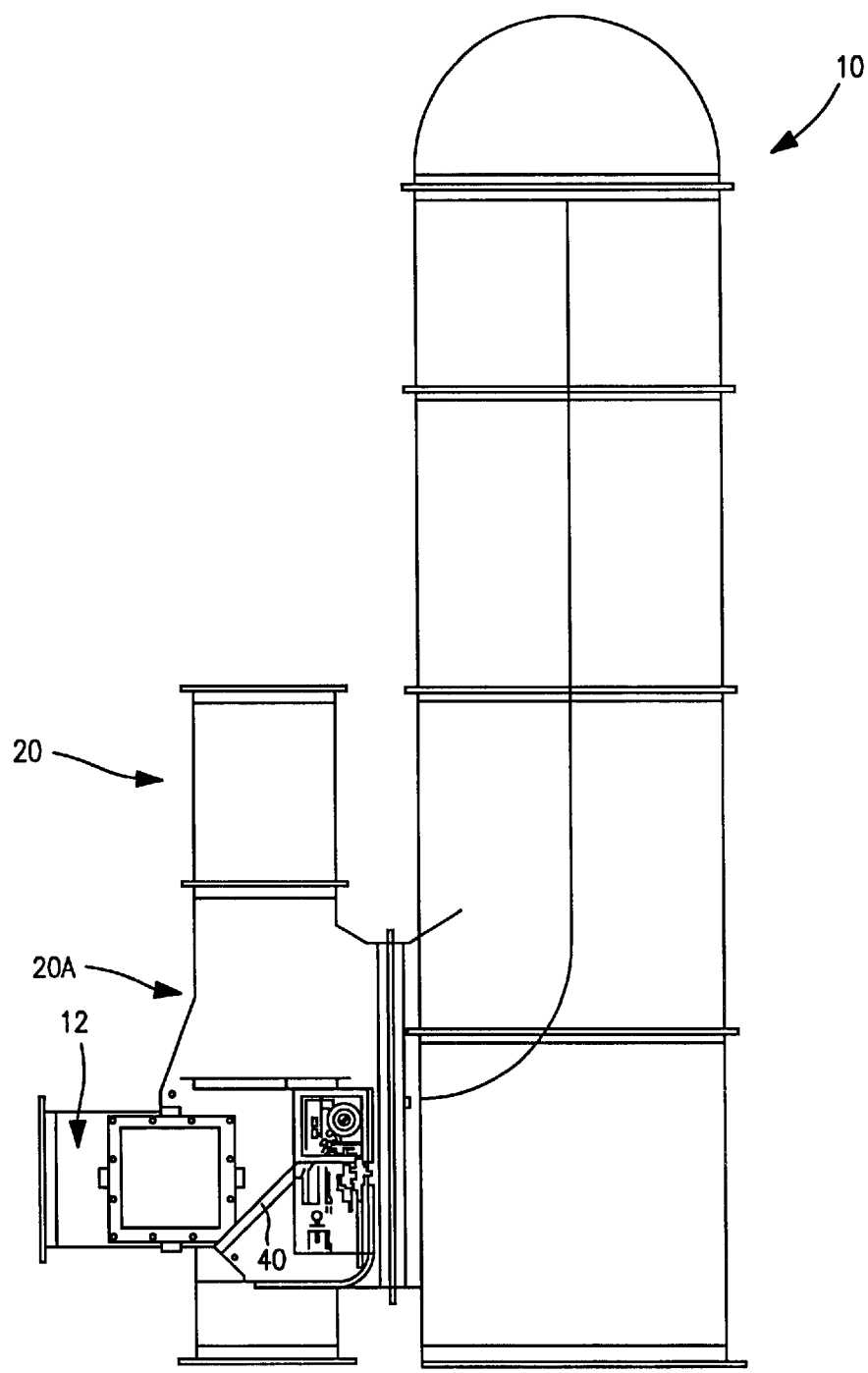
FIG. 1 is a cross-sectional view of an entrapment chamber and damper assembly in accordance with the present invention.

Turning first to FIG. 1, there is shown an entrapment chamber 10 in communication with an exhaust stack 20. The exhaust stack 20 received a flow of exhaust gas from the regenerative oxidizer via duct 12. A damper 40 is disposed in the exhaust stack 20 and is shown in the down position, thereby allowing the gas flow from the oxidizer to travel up the exhaust stack 20 and out to atmosphere. An important feature of this design is that the gas flow from the oxidizer assists in sealing the damper in the down position. When in the up position, the damper 40 prevents flow directly up the exhaust stack; flow instead passes through a straight path into the entrapment chamber 10 with an increase in flow area, resulting in little or no impact on the flow characteristics of the oxidizer.

Figure 2:
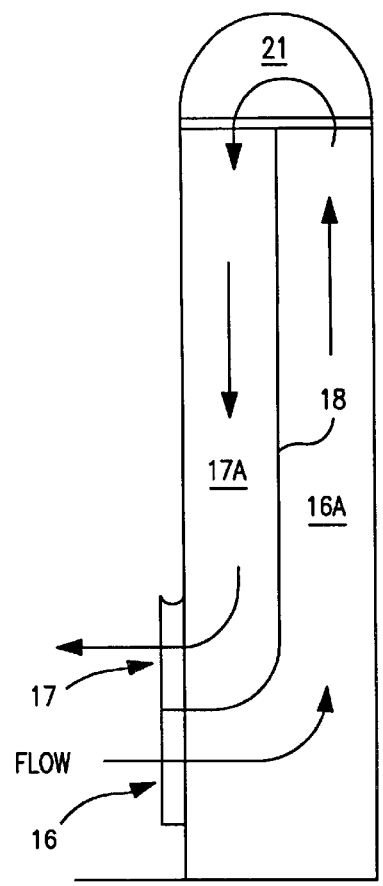
FIG. 2 is a cross-sectional view of an entrapment chamber in accordance with the present invention.
Figure 3:
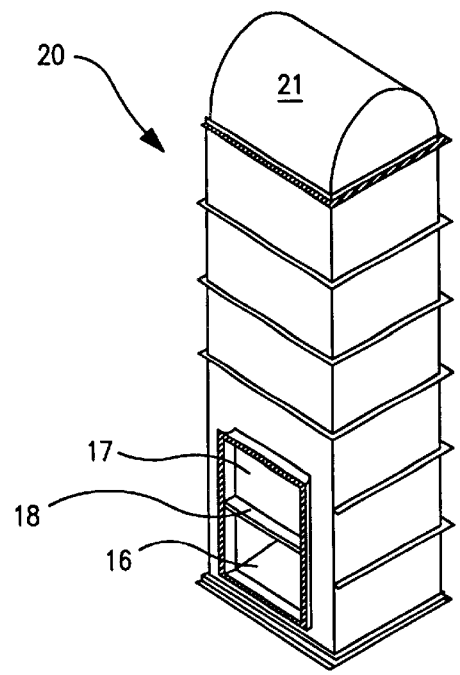
FIG. 3 is an isometric view of an entrapment chamber in accordance with the present invention.

Details of the preferred embodiment of the entrapment chamber 10 are shown in FIGS. 2 and 3. The chamber 10 includes an inlet 16 and a segregated outlet 17. The inlet 16 and the outlet 17 are separated by wall 18. Thus, as shown by the arrows, flow from the oxidizer enters inlet 16, flows up the stack 10 in inlet path 16A, into outlet path 17A in communication with inlet path 16A at top section 21, and out outlet 17 to either the return pipe 48 or to the exhaust stack 20.

Preferably the entrapment chamber is a modular design, facilitating the addition (or deletion) of modular sections to add to (or delete from) the holding volume of the chamber. For example, apex section 21 of the chamber 20 can be removed, and one or more additional modular sections can be added or removed, followed by reattaching apex section 21. In one embodiment, the entrapment chamber is designed to contain 2 to 5 seconds of flow.

A return pipe 48 (FIG. 8) in fluid communication with the entrapment chamber 10 is used to clean out the entrapment chamber 10 between switches by directing the gases therein back to the fan inlet of the oxidizer.

Figure 4:
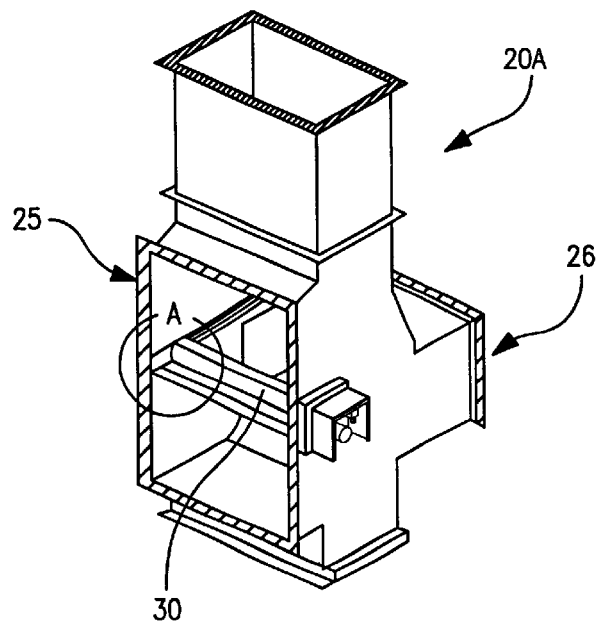
FIG. 4 is an isometric view of the exhaust stack base assembly in accordance with the present invention.
Figure 4A:
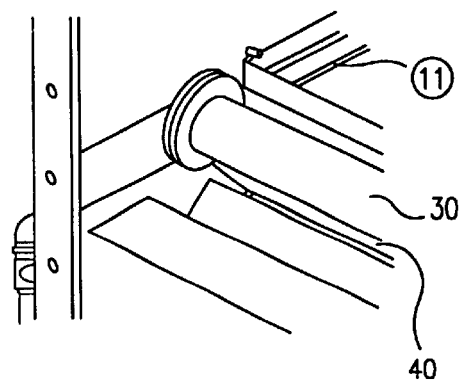
FIG. 4A is an enlarged isometric view of the detail A in FIG. 4.
Figure 5:
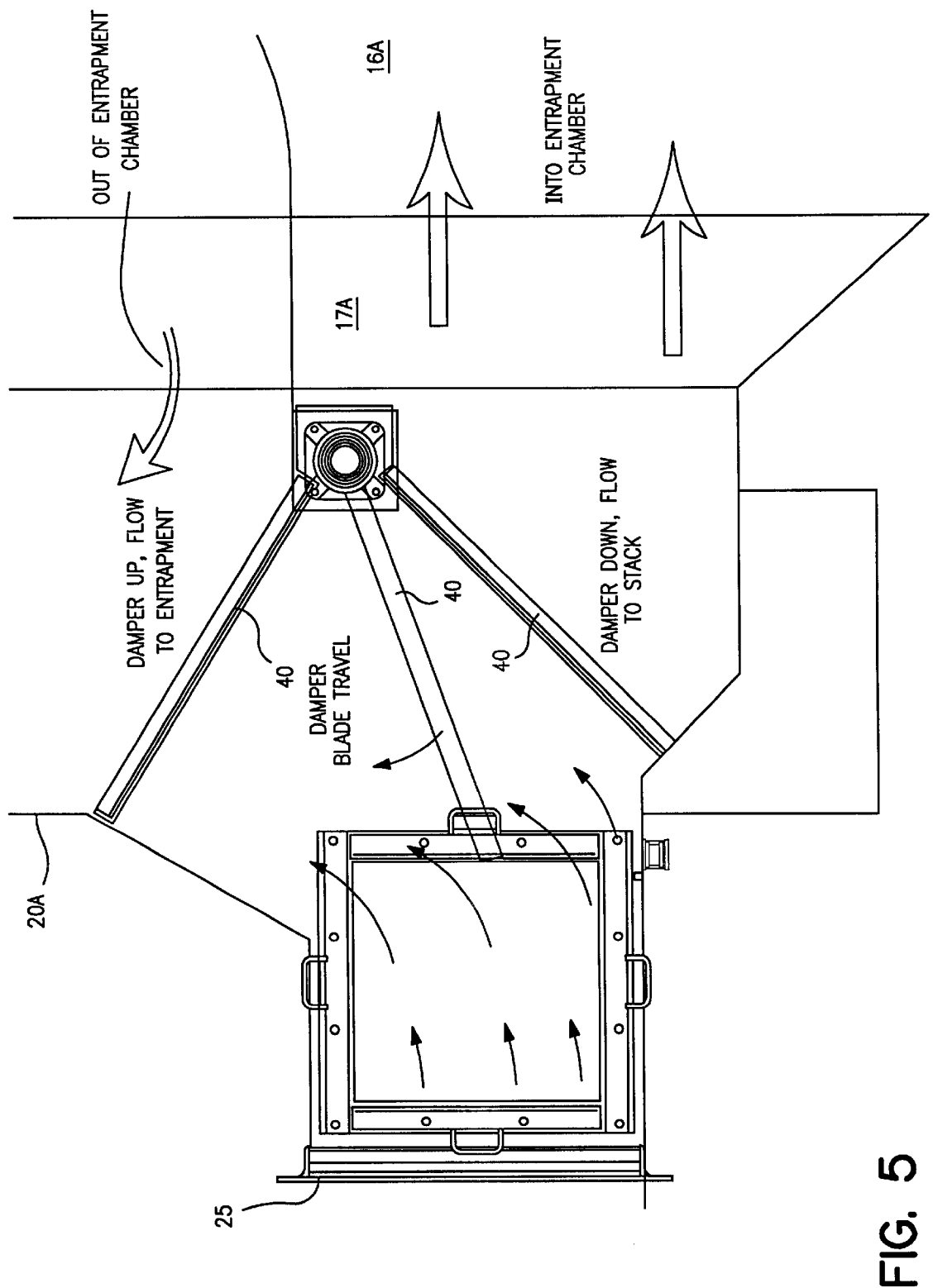
FIG. 5 is a schematic view of a portion of the exhaust stack, damper and entrapment chamber of the present invention.
Figure 6:
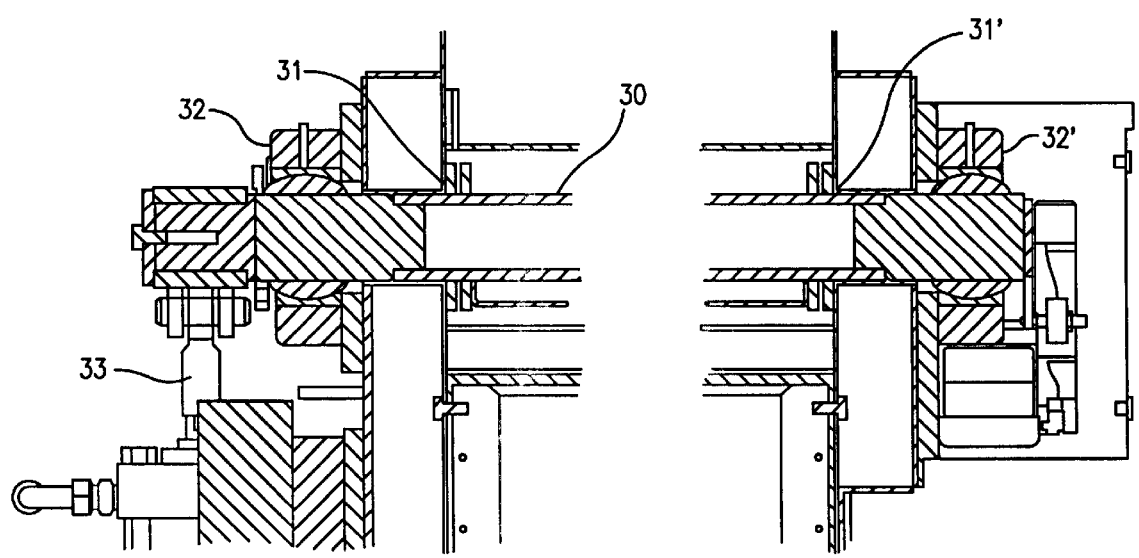
FIG. 6 is a cross-sectional view of the damper in accordance with the present invention.

Turning now to FIGS. 4–6, details of the damper assembly are shown. Base 20A of exhaust stack 20 includes inlet 25 in communication with the oxidizer (not shown) and outlet 26 in communication with the entrapment chamber 10. Disposed between the inlet 25 and outlet 26 is the damper assembly of the present invention. The assembly includes cylinder 30, which passes through apertures 31, 31' in the base assembly 20A and is rotatably coupled via bearings 32, 32' as shown in FIG. 6. The cylinder 30 can be actuated with an air cylinder 33.

Figure 7:
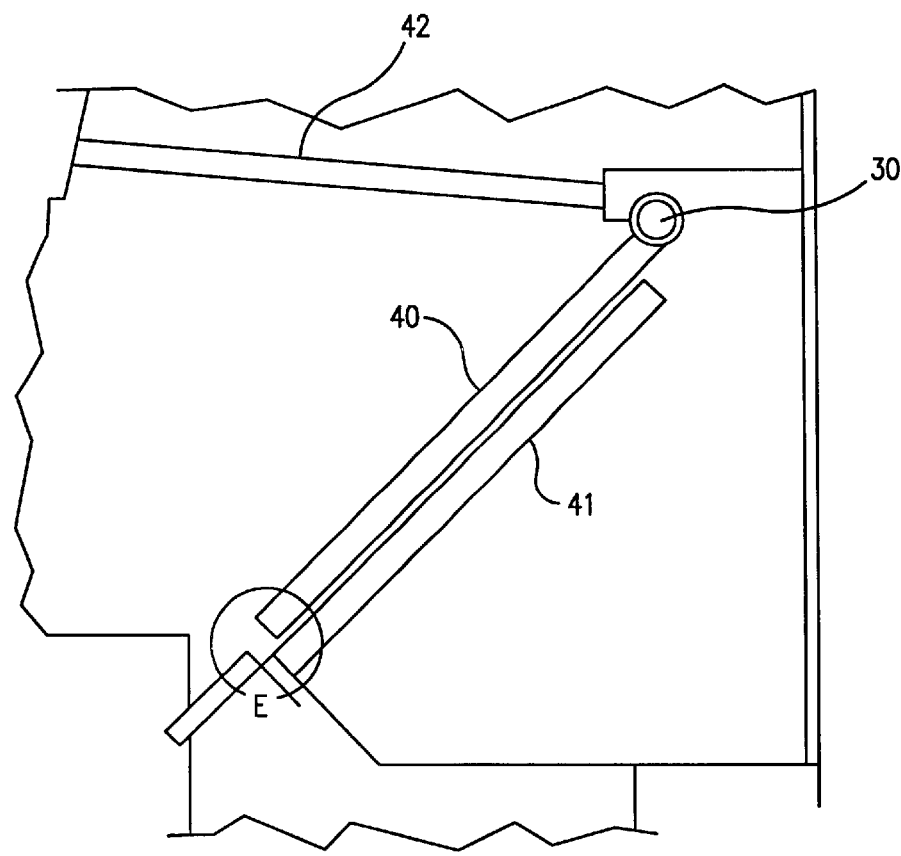
FIG. 7 is a cross-sectional view of the damper blade in accordance with the present invention.
Figure 7A:
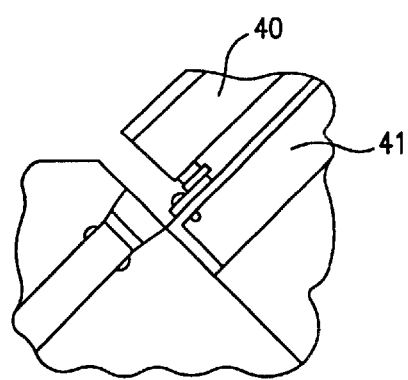
FIG. 7A is a detailed view of the edge of the damper blade of FIG. 7.

Attached to cylinder 30 is damper blade 40. The blade 40 extends from the cylinder 30 and seals against lower damper blade stop 41 in the lowered position shown in FIG. 7. In this sealed position, flow is blocked from the oxidizer to the entrapment chamber 10. Details of the seal are shown in FIG. 7A. The damper 40 has a range of motion of about 45°. When in the up position, blade 40 seals against upper damper blade stop 42, preventing flow from the oxidizer to the exhaust stack 20. This is shown schematically in FIG. 5, with the damper blade 40 in shown in three positions: damper down, flow to exhaust stack position, damper travel position (shown in phantom), and damper up, flow to entrapment chamber position.

Figure 8:
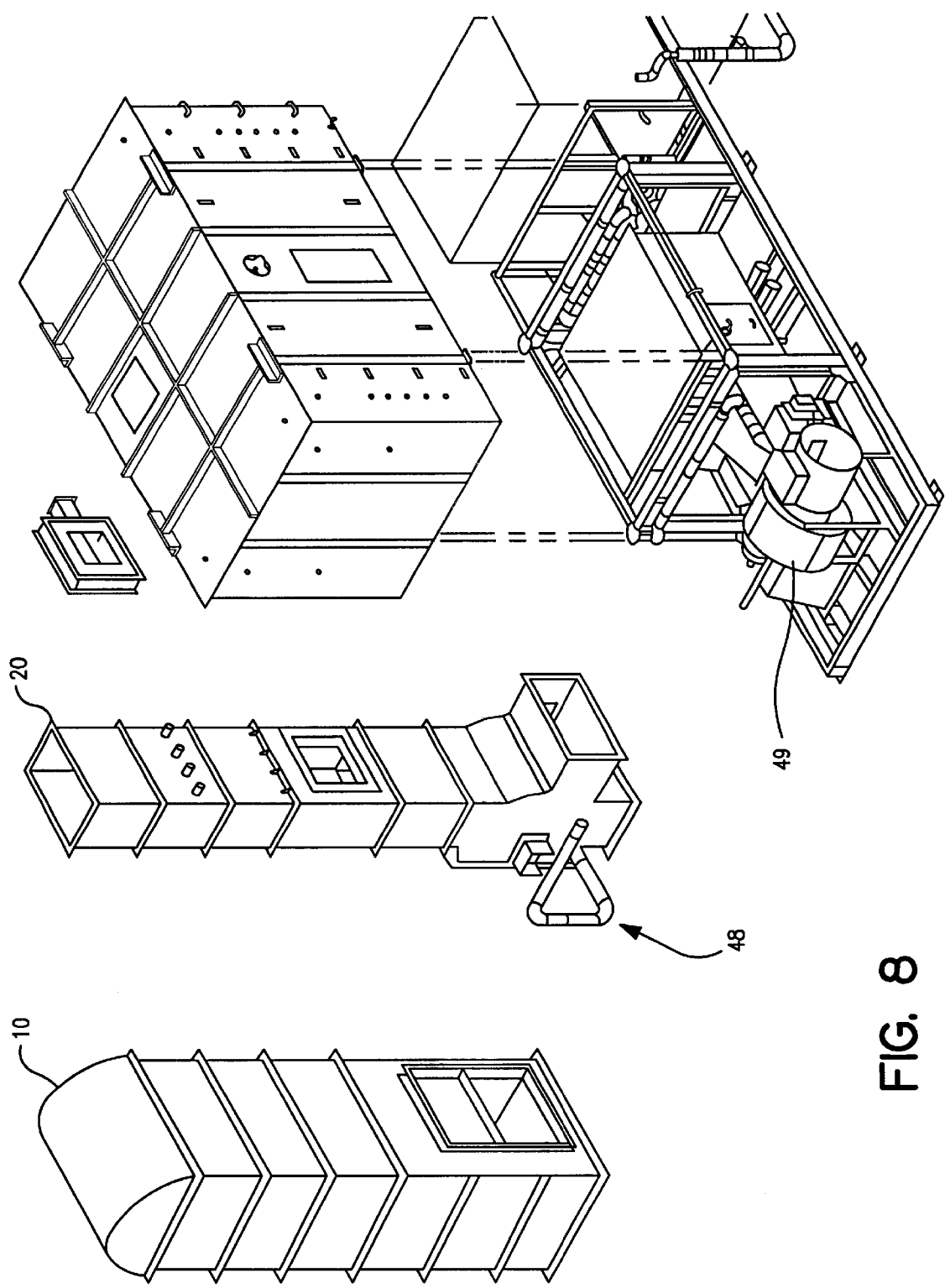
FIG. 8 is an exploded view of the regenerative oxidizer in accordance with the present invention.

As shown in FIG. 8, the regenerative oxidizer 100 that is integrated with the exhaust stack 20 and entrapment chamber 10 is preferably a two-column oxidizer. With regenerative thermal oxidation technology, the heat transfer zones in each column must be periodically regenerated to allow the heat transfer media (generally a bed of ceramic stoneware or saddles) in the depleted energy zone to become replenished. This is accomplished by periodically alternating the heat transfer zone through which the cold and hot fluids pass. Specifically, when the hot fluid passes through the heat transfer matrix, heat is transferred from the fluid to the matrix, thereby cooling the fluid and heating the matrix. Conversely, when the cold fluid passes through the heated matrix, heat is transferred from the matrix to the fluid, resulting in cooling of the matrix and healing of the fluid. Consequently, the matrix acts as a thermal store, alternately accepting heat from the hot fluid, storing that heat, and then releasing it to the cold fluid.

More specifically, each heat exchanger includes a cold end and a hot end. The cold end serves as an inlet for relatively cool process gas containing VOC's to be oxidized, or as an outlet for relatively cool process gas whose VOC's have been oxidized, depending upon the cycle of the oxidizer at any given time. Spaced from each cold end is a hot end, which in each case is nearest the combustion zone. Between the cold end and hot end of each heat exchanger, a matrix of refractory heat exchange media is placed. In one embodiment, the matrix of heat exchange media is one or more monolithic blocks, each having a plurality of defined vapor flow passages.

In operation, solvent laden air is directed into the regenerative oxidizer 100 such as by use of an inlet fan 49. The solvent laden air is then directed into a heat exchange column, and through the heat exchange media disposed therein. Heat is transferred from the hot heat exchange media to the cooler solvent laden air, so that by the time this air exits the opposite end of the column of media, it has been heated to the operating temperature (or set-point) or close to the operating temperature of the oxidizer. A burner or other heating device associated with a combustion zone in communication with the heat exchange column can assist in raising the air to the set-point temperature where necessary, and oxidation of the VOCs, which was begun in the heat exchange media, is completed if necessary. The hot, now purified air then passes through the bed of heat exchange media in the other (now cool) heat exchange column (also in communication with the combustion zone), and the hot air heats the cooler media therein so that by the time the air exits the opposite end of this second column, it has been cooled to an acceptable temperature, such as a temperature only slightly higher than that of the incoming solvent laden air. It is then exhausted through the exhaust stack 20, with the damper 40 in the down position, preventing flow to the entrapment chamber 10. During this stage of operation, flow from the oxidizer does not enter the entrapment chamber 10, although the entrapment chamber outlet 17 remains in communication with the exhaust stack 20.

At periodic intervals, flow through the oxidizer is reversed by simultaneously actuating valving in connection with the gas flow. The frequency of the flow reversals is directly related to the volumetric flow through the oxidizer, and can be readily determined by those skilled in the art. When a flow reversal occurs on the oxidizer, the "puff" of VOC laden air that normally would be released to atmosphere is directed to the entrapment chamber 10 by actuation of the damper blade 40 to the up position of FIG. 5. These untreated gases flow into the entrapment chamber 10, and through pathways 16A and 17A. The volume of the entrapment chamber 20 is sufficient so that the volume of untreated gas does not reach the outlet 17 of the entrapment chamber during this switching stage; it is thus "stored" in the chamber during switching. Once the switching is complete and the damper returns to the down position, the untreated gas stored in the entrapment chamber 20 is slowly pulled back to the oxidizer inlet to be cleaned, via return pipe 48. Since the entrapment chamber 20 is always open to the exhaust stack via outlet 17, it slowly fills with clean air from the stack during this stage.

What is claimed is:

1. A regenerative heat source comprising at least one heat exchange column, said at least one column having a gas inlet and a gas outlet, said at least one column being in communication with a combustion zone, and containing heat exchange material;

an exhaust outlet in fluid communication with said regenerative heat source;

an entrapment chamber in fluid communication with said regenerative heat source; and a damper associated with said exhaust outlet and said entrapment chamber, said damper being actuatable between a first position adapted to block flow from said regenerative heat source to said entrapment chamber, and a second position adapted to block flow from said regenerative heat source to said exhaust outlet.

2. The regenerative heat source of claim 1, wherein there are at least two heat exchange columns.

3. The regenerative heat source of claim 1, further comprising a lower damper stop against which said damper is in abutting relation when in said first position, and an upper damper stop against which said damper is in abutting relation when in said second position.

4. The regenerative heat source of claim 1, wherein said entrapment chamber comprises an inlet flow and an outlet flow path.

5. The regenerative heat source of claim 1, wherein said damper comprises a rotatable cylinder and a damper blade coupled thereto.

6. The regenerative heat source of claim 1, wherein the flow from said regenerative heat source assists in maintaining said damper in said first position.

7. The regenerative heat source of claim 2, further comprising valving for alternating the flow of gas into the gas inlets of said heat exchange columns, and wherein said damper is actuated to move from said first position to said second position when said valving is actuated to direct flow from said gas inlet of one said heat exchange columns to said gas inlet of the other of said heat exchange columns.

* * * * *